United States Patent Office 3,304,426
Patented Feb. 14, 1967

3,304,426
CONTACT ELECTROMETERS WITH
OSCILLATING BLADES
Gilbert Ganouna-Cohen, Bagneux, Seine, France, assignor to Commissariat à l'Energie Atomique, Paris, France
Filed Aug. 1, 1963, Ser. No. 299,219
Claims priority, application France, Aug. 8, 1962, 906,478
2 Claims. (Cl. 250—83.6)

Figure 1:
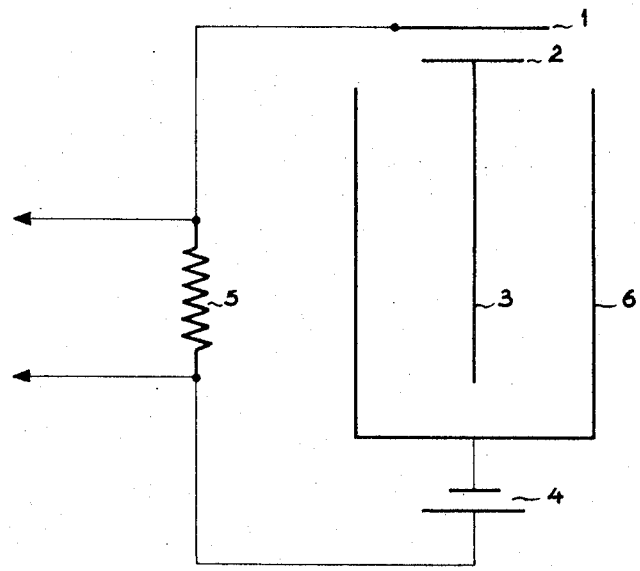

Contact electrometers for measuring weak electrical charges liberated in a detector having very high output impedance, such as an ionisation chamber, constituted as shown in the diagram shown in FIGURE 1 of the accompanying drawings, are already known.

The known electrometer in FIGURE 1 comprises two electrodes of which one 1 is movable and the other, shown at 2, is fixed, the fixed electrode being connected to a collector electrode 3 of the ionisation chamber while the movable electrode is connected to one of the poles of a voltage source 4 through a resistor 5, the other pole of the voltage source 4 being connected to the outer casing 6 of the ionisation chamber. Under the action of radiations on the ionisation chamber, ions appear between the collector electrode 3 and the casing 6 of the chamber; depending upon their sign, ions are collected by the electrode 3 or by the casing 6 and contribute to the reduction in the potential difference existing between electrode 3 and casing 6. The potential difference between the movable electrode 1 and the fixed electrode 2 increases in such a manner that the sum of the potential differences existing between electrodes 1 and 2 on the one hand and electrode 3 and casing 6 on the other hand, is always equal to the potential difference of the source 4. The greater the action produced on the ionisation chamber by the radiations, the larger the potential difference between 1 and 2, and, once a certain quantity of radiations has acted on the chamber, this potential difference is sufficient to cause the attraction of the movable electrode 1 by the fixed electrode 2 and finally contact of these two electrodes. On contact, the capacitance formed by the electrodes 1 and 2 is discharged, giving a brief pulse at the terminals of the resistor 5. Although the two electrodes 1 and 2 are then at the same potential, the electrode 1 does not, however, return to its initial position, since a very weak ionisation current continues to pass between the electrodes 1 and 2, which are in contact, and keeps the movable electrode 1 in such contact with the fixed electrode 2. In order to separate the movable electrode 1 from the fixed electrode 2, it is necessary to oppose the holding force by a counteracting force which may in particular be supplied by a permanent magnet. In this particular case, the sensitivity of the electrometer is greatly reduced.

It is a main object of the present invention to overcome the aforementioned disadvantages and to this end the invention consists in a contact electrometer, particularly for the measurement of weak electrical charges liberated in a detector having very high output impedance, such as an ionisation chamber, said electrometer comprising a first fixed electrode connected to the collector electrode of the detector, a second fixed electrode connected, via an outer circuit comprising a resistor, to one of the poles of a voltage source, the other pole of which source is connected to the outer casing of the detector, and a movable blade insulated from said electrodes and located between them in such a manner that it is attracted by each of said electrodes alternately, contact with one of the said electrodes giving it the potential of the later, so that it is then repelled from it and simultaneously attracted by the other electrode, a pulse in the outer circuit corresponding to each contact of the movable blade with one of said electrodes.

The invention also covers the characteristics described below and their various possible combinations.

Figure 2:
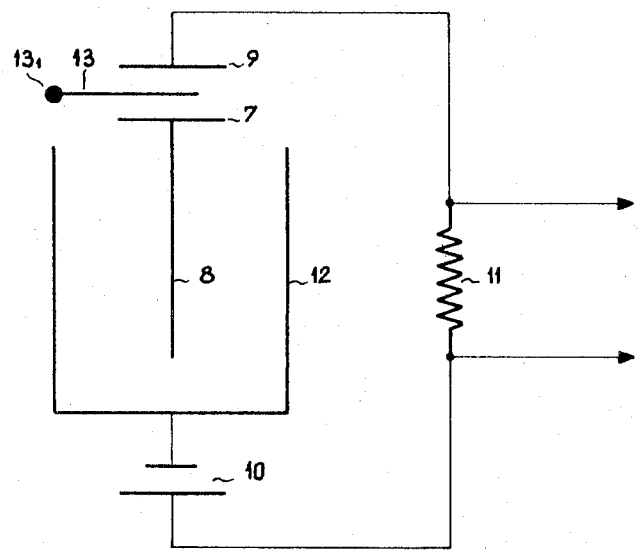

In the accompanying drawings, FIG. 1 shows a contact electrometer of known type; and A contact electrometer in accordance with the invention is diagrammatically illustrated (by way of non-limiting example) in FIGURE 2 of the accompanying drawings.

In accordance with the invention, the contact electrometer illustrated in FIGURE 2 essentially comprises a first fixed electrode 7 directly connected to the collector electrode 8 of a detector having very high output impedance, such as an ionisation chamber, a second electrode, also fixed, 9, this one being connected to one of the poles of a voltage source 10, and an outer circuit comprising a resistor 11. The second pole of the voltage source 10 is connected to the outer casing 12 of the detector and a movable blade 13 insulated from the two aforementioned electrodes 7 and 9 is located between the said electrodes in such a manner that it may come in contact with either of them. Blade 13 is normally held in a horizontal position, as seen in FIG. 2, by any known mounting means $13_1$ such as described in United States Patent No. 3,153,710.

Under the action of radiations on the ionisation chamber, charges appear on the fixed armatures or electrodes 7 and 9 and by induction on the movable blade 13. As the said blade 13 is preferably positioned very slightly nearer one of the electrodes 7 and 9, e.g., the electrode 9, then, when it is simultaneously attracted by the two electrodes, it will first move to touch the electrode 9, to which it is closer. On contact with the electrode 9, the movable blade 13 is charged at the potential of the said electrode, whence it is then repelled and simultaneously attracted by the fixed electrode 7, the potential of which it acquires as it comes into contact with it. It is then repelled by this armature or electrode 7 and attracted by the armature or electrode 9 and so on.

On each contact of the movable blade 13 with one or other of the two electrodes 7 and 9, there is a pulse in the outer circuit 11 and the continuous ionisation current cannot hold the blades in contact, since the blade 13 is insulated from the circuit assembly and only transports charges from the electrode 9 to the electrode 7.

The contact electrometer diagrammatically illustrated in FIGURE 2 therefore enables the interference effect of the direct current delivered by the ionisation chamber to be eliminated; in known electrometers, this effect necessitates the use of means to control the separation of the movable blade from the fixed electrode after the contact of the two and this to the detriment of the sensitivity of the electrometer.

It is clear that the invention is not limited to the embodiment which has been described and illustrated.

If necessary, other embodiment and constructions may be used without thereby departing from the scope of the invention.

I claim:

1. A contact electrometer, particularly for the measurement of weak electrical charges liberated in a detector having very high output impedance, such as an ionisation chamber, said electrometer comprising a first fixed electrode connected to the collector electrode of the detector, a second fixed electrode connected through an outer circuit comprising a resistor, to one of the poles of a voltage source, the other pole of which source is connected to the outer casing of the detector, and a movable blade electrically isolated from said outer circuit and from said fixed electrodes and located between said fixed electrodes for contact with said fixed electrodes.

2. A contact electrometer as claimed in claim 1, wherein the movable blade is located slightly nearer one of said fixed electrodes.

References Cited by the Examiner
UNITED STATES PATENTS

| | | | |
|---|---|---|---|
| 2,794,955 | 6/1957 | Rich | 324—109 |
| 2,812,443 | 11/1957 | Rich | 250—83.3 |
| 2,920,250 | 1/1960 | Thomas | 200—87 |
| 3,004,164 | 10/1961 | Sievert | 250—83.6 |

ARCHIE R. BORCHELT, *Primary Examiner.*

JAMES W. LAWRENCE, RALPH G. NILSON,
*Examiners.*